United States Patent
Yu et al.

(10) Patent No.: US 8,639,510 B1
(45) Date of Patent: Jan. 28, 2014

(54) ACOUSTIC SCORING UNIT IMPLEMENTED ON A SINGLE FPGA OR ASIC

(76) Inventors: Kai Yu, Pittsburgh, PA (US); Rob A. Rutenbar, Pittsburgh, PA (US)

( * ) Notice: Subject to any disclaimer, the term of this patent is extended or adjusted under 35 U.S.C. 154(b) by 1007 days.

(21) Appl. No.: 12/341,160

(22) Filed: Dec. 22, 2008

Related U.S. Application Data

(60) Provisional application No. 61/008,727, filed on Dec. 24, 2007.

(51) Int. Cl.
*G10L 15/14* (2006.01)
*G10L 15/00* (2013.01)
*G10L 15/18* (2013.01)

(52) U.S. Cl.
USPC ............... 704/256.6; 704/256.1; 704/256; 704/257

(58) Field of Classification Search
USPC ........ 704/231, 255, 256, 256.1, 256.4, 256.6, 704/256.7, E15.05
See application file for complete search history.

(56) References Cited

U.S. PATENT DOCUMENTS

| | | | | |
|---|---|---|---|---|
| 5,699,456 A | * | 12/1997 | Brown et al. | 382/226 |
| 5,794,197 A | * | 8/1998 | Alleva et al. | 704/255 |
| 5,809,462 A | | 9/1998 | Nussbaum | |
| 5,881,312 A | | 3/1999 | Dulong | |
| 5,937,384 A | * | 8/1999 | Huang et al. | 704/256 |
| 6,539,353 B1 | * | 3/2003 | Jiang et al. | 704/254 |
| 6,629,073 B1 | * | 9/2003 | Hon et al. | 704/256.4 |
| 6,671,669 B1 | | 12/2003 | Garudadri et al. | |
| 6,804,642 B1 | | 10/2004 | Naylor | |
| 6,836,758 B2 | | 12/2004 | Bi et al. | |
| 7,024,359 B2 | | 4/2006 | Chang et al. | |
| 7,080,011 B2 | | 7/2006 | Baumgartner et al. | |
| 7,089,178 B2 | | 8/2006 | Garudadri et al. | |
| 7,139,714 B2 | | 11/2006 | Bennett et al. | |
| 7,203,368 B2 | | 4/2007 | Nefian et al. | |
| 7,209,880 B1 | | 4/2007 | Gajic et al. | |

(Continued)

FOREIGN PATENT DOCUMENTS

| | | |
|---|---|---|
| GB | 0420464.0 | 9/2004 |
| JP | 2001265383 | 9/2001 |

(Continued)

OTHER PUBLICATIONS

Huang et al. "Predicting Unseen Triphones with Senones". IEEE Transactions on Speech and Audio Processing, vol. 4 No. 6, 1996.*

(Continued)

*Primary Examiner* — Jesse Pullias
(74) *Attorney, Agent, or Firm* — David Garrod, Esq

(57) ABSTRACT

A hardware acoustic scoring unit for a speech recognition system and a method of operation thereof are provided. Rather than scoring all senones in an acoustic model used for the speech recognition system, acoustic scoring logic first scores a set of ciphones based on acoustic features for one frame of sampled speech. The acoustic scoring logic then scores senones associated with the N highest scored ciphones. In one embodiment, the number (N) is three. While the acoustic scoring logic scores the senones associated with the N highest scored ciphones, high score ciphone identification logic operates in parallel with the acoustic scoring unit to identify one or more additional ciphones that have scores greater than a threshold. Once the acoustic scoring unit finishes scoring the senones for the N highest scored ciphones, the acoustic scoring unit then scores senones associated with the one or more additional ciphones.

12 Claims, 7 Drawing Sheets

(56) References Cited

U.S. PATENT DOCUMENTS

| | | | |
|---|---|---|---|
| 7,274,819 | B2 | 9/2007 | Matsugu et al. |
| 7,328,153 | B2 | 2/2008 | Wells et al. |
| 7,360,068 | B2 | 4/2008 | Borgatti et al. |
| 7,451,081 | B1 | 11/2008 | Gajic et al. |
| 7,457,750 | B2 | 11/2008 | Rose et al. |
| 7,480,617 | B2 | 1/2009 | Chu et al. |
| 7,493,258 | B2 | 2/2009 | Kibkalo et al. |
| 7,587,319 | B2 | 9/2009 | Catchpole |
| 7,877,258 | B1 | 1/2011 | Chelba et al. |
| 2008/0255839 | A1 | 10/2008 | Larri et al. |
| 2009/0043818 | A1 | 2/2009 | Raichelgauz et al. |
| 2009/0304268 | A1 | 12/2009 | Cadambi et al. |
| 2010/0094858 | A1 | 4/2010 | Indeck et al. |
| 2010/0211391 | A1 | 8/2010 | Chen |

FOREIGN PATENT DOCUMENTS

| | | | |
|---|---|---|---|
| KR | 20020048357 | | 6/2002 |
| WO | 98/57489 | A2 | 12/1998 |
| WO | 01/31628 | A2 | 5/2001 |
| WO | WO 01/31628 | A2 | 5/2001 |
| WO | 02/07148 | A1 | 1/2002 |
| WO | 02/31816 | A1 | 4/2002 |
| WO | WO 03/094152 | | 4/2003 |
| WO | WO2006030214 | | 3/2006 |
| WO | 2007/098055 | A2 | 8/2007 |
| WO | 2009/070931 | A1 | 6/2009 |
| WO | 2009/088718 | A2 | 7/2009 |

OTHER PUBLICATIONS

Bourke et al. "A High-Performance Hardware Speech Recognition System for Mobile Applications", Proc. SRS Techcon, 2005.*
Chandra et al. "Architecture for Low Power Large Vocabulary Speech Recognition". IEEE International SOC Conference, 2006.*
Melnikoff et al. "Speech Recognition in FPGA using Discrete and Continuous Hidden Markov Models". In Proc. 12th Intl. Conf. on Field Programmable Logic and Applications, 2002.*
S Glinski et al., "Spoken Language Recognition on a DSP Array Processor," IEEE Transactions on Parallel and Distributed Systems, Jul. 5, 1994, No. 7, New York, USA, pp. 697-703.
S. Chatterjee et al., "Connected Speech Recognition on a Multiple Processor Pipeline," ICASSP 89, May 23, 1989, Glasgow, UK, pp. 774-777.
R. Krishna et al., "Architectural Optimizations for Low-Power, Real-Time Speech Recognition," CASES '03: Proceedings of the 2003 International Conference on Compilers, Architecture and Synthesis for Embedded Systems, ACM, New York, NY, USA, pp. 220-231.
T. S. Anantharaman et al., "A hardware accelerator for speech recognition algorithms," Proceedings of the 13th Annual International Symposium on Computer architecture, p. 216-223, Jun. 2-5, 1986.
R. Dujari, "Parallel Viterbi Search Algorithm for Speech Recognition," M.S. Thesis, Mass. Inst. of Tech., Feb. 1992.
J. Chong et al., "Data-Parallel Large Vocabulary Continuous Speech Recognition on Graphics Processors," Technical Report No. UCB/EECS-2008-69, May 22, 2008.
M. Ravishankar, "Parallel implementation of fast beam search for speaker-independent continuous speech recognition," 1993.
L. Baugh et al., "Sphinx Parallelization," Sep. 16, 2002.
S.-H. Chung et al., "A Parallel Phoneme Recognition Algorithm Based on Continuous Hidden Markov Model," 13th International and 10th Symposium on Parallel and Distributed Processing, 1999.
M. Fleury et al., "Parallel Structure in an Integrated Speech-Recognition Network," Euro-Par'99, LNCS 1685, pp. 995-1004, 1999.
J Chong et al., "Opportunities and Challenges of Parallelizing Speech Recognition," Proceedings of the 2nd USENIX conference on Hot topics in parallelism, USENIX Association, Berkeley, CA, 2010.
H. Bourlard et al., "Multi-stream speech recognition," Technical Report RR 96-07, IDIAP Research Institute, Martigny, Switzerland, Dec. 1996.
E. C. Lin et al., "A 1000-Word Vocabulary, Speaker-Independent, Continuous Live-Mode Speech Recognizer Implemented in a Single FPGA," FPGA'07, Feb. 18-20, 2007, Monterey, CA, pp. 60-68.
R. A. Kavaler et al., "A dynamic-time-warp integrated circuit for a 1000-word speech recognition system," IEEE J. of Solid State Circuits, Feb. 1987, pp. 3-14.
L. Cali et al., "Co-Design Method Enables Speech Recognition SoC," EETimes, Nov. 2001, p. 12.
B. Mathew et al., "A Low-Power Accelerator for the SPHINX 3 Speech Recognition System," CASES'03, Oct. 30-Nov. 1, 2003, San Jose, CA, pp. 210-319.
S. Nedevschi et al., "Hardware Speech Recognition on Low-Cost and Low-Power Devices," Proc. Design and Automation Conference, 2005, pp. 684-689.
A. Stolzle et al., "Integrated Circuits for a Real-Time Large-Vocabulary Continuous Speech Recognition System," IEEE Journal of Solid-State Circuits, vol. 26, No. 1, pp. 2-11, Jan. 1991.
L. D. Paulson, "Speech Recognition Moves from Software to Hardware," IEEE Computer, Nov. 2006, pp. 15-18.
T. Fujinaga et al., "Parallelized Viterbi Processor for 5,000-Word Large-Vocabulary Real-Time Continuous Speech Recognition FPGA System," Interspeech 2009, pp. 1483-1486.
S. Yoshizawa et al., "Scalable Architecture for Word HMM-Based Speech Recognition and VLSI Implementation in Complete Complete System," IEEE Trans. on Circuits and Systems, Jan. 2006, pp. 70-77.
P. Cardinal et al., "GPU Accelerated Acoustic Likelihood Computations," Interspeech 2008.
P. J. Bourke et al., "A Low-Power Hardware Search Architecture for Speech Recognition," Interspeech 2008.
K. You et al., "Architectural Design and Implementation of an FPGA Softcore Based Speech Recognition System," 6th International Workshop on System on Chip for Real Time Applications, Dec. 2006, pp. 50-55.
A. Burstein et al., "Using Speech Recognition in a Personal Communications System," ICC '92, Jun. 1992, pp. 1717-1721.
P. Saha, "Application Hardware-Software Co-Design for Reconfigurable Computing Systems," Ph.D. thesis, George Washington Univ., May 2008.
H. Wei, "A speech recognition IC with an efficient MFCC extraction algorithm and multi-mixture models," Ph.D. thesis, The Chinese University of Hong Kong (Hong Kong), 2006 (Preview).
R. Veitch et al., "FPGA Implementation of a Pipelined Gaussian Calculation for HMM-Based Large Vocabulary Speech Recognition," International Journal of Reconfigurable Computing, 2011, pp. 1-10.
Introduction to Automatic Speech Recognition, 6.345 Automatic Speech Recognition, Lecture # 1, MIT, 2003.
Acoustic Theory of Speech Production, 6.345 Automatic Speech Recognition, Lecture # 2, MIT, 2003.
Speech Sounds of American English, 6.345 Automatic Speech Recognition, Lecture # 3-4, MIT, 2003.
Speech Signal Representation, 6.345 Automatic Speech Recognition, Lecture # 5, MIT, 2003.
Vector Quantization and Clustering, 6.345 Automatic Speech Recognition, Lecture # 6, MIT, 2003.
Pattern Classification, 6.345 Automatic Speech Recognition, Lecture # 7, MIT, 2003.
Pattern Classification, 6.345 Automatic Speech Recognition, Lecture # 8, MIT, 2003.
Dynamic Time Warping & Search, 6.345 Automatic Speech Recognition, Lecture # 9, MIT, 2003.
Hidden Markov Modelling, 6.345 Automatic Speech Recognition, Lecture # 10, MIT, 2003.
Language Modelling for Speech Recognition, 6.345 Automatic Speech Recognition, Lecture # 11-12, MIT, 2003.
A Practical Introduction to Graphical Models and their use in ASR, 6.345 Automatic Speech Recognition, Lecture # 13, MIT, 2003.
R. Singh, Part I: Designing HMM-based ASR systems, 6.345 Automatic Speech Recognition, Lecture # 14, MIT, 2003.
R. Singh, Part II: Training continuous density HMMs, 6.345 Automatic Speech Recognition, Lecture # 15, MIT, 2003.

(56) References Cited

OTHER PUBLICATIONS

Segment-Based Speech Recognition, 6.345 Automatic Speech Recognition, Lecture # 16, MIT, 2003.
Finite-State Techniques for Speech Recognition, 6.345 Automatic Speech Recognition, Lecture # 17, MIT, 2003.
ASR for Spoken-Dialogue Systems, 6.345 Automatic Speech Recognition, Lecture # 18, MIT, 2003.
Modelling New Words, 6.345 Automatic Speech Recognition, Lecture # 19, MIT, 2003.
T. J. Hazen, Noise Robustness and Confidence Scoring, 6.345 Automatic Speech Recognition, Lecture # 20, MIT, 2003.
T. J. Hazen, Speaker Adaptation, 6.345 Automatic Speech Recognition, Lecture # 21, MIT, 2003.
Conversational Systems: Advances and Challenges, 6.345 Automatic Speech Recognition, Lecture # 22, MIT, 2003.
Paralinguistic Information Processing, 6.345 Automatic Speech Recognition, Lecture # 23, MIT, 2003.
O. Cheng, et al., "Hardware-Software Codesign of Automatic Speech Recognition System for Embedded Real-Time Applications," IEEE Transactions on Industrial Electronics, Vol. 58, No. 3, Mar. 2011, pp. 850-859.
A. Chun, et al., "ISIS: An Accelerator for Sphinx Speech Recognition," 2011 IEEE 9th Symposium on Application Specific Processors (SASP), pp. 58-61.
P. EhKan, et al., "FPGA Implementation for GMM-Based Speaker Identification," International Journal of Reconfigurable Computing, vol. 2011, pp. 1-8.
P. Li, et al., "Design of a Low-Power Coprocessor for Mid-Size Vocabulary Speech Recognition Systems," IEEE Transactions on Circuits and Systems—I: Regular Papers, vol. 58, No. 5, May 2011, pp. 961-970.
L. Li, et al., "Design of Speech Recognition Co-Processor with Fast Gaussian Likelihood Computation," 3rd International Conference on Computer Research and Development (ICCRD), Mar. 11-13, 2011, pp. 392-395.
K. You, et al., "Memory Access Optimized VLSI for 5000-Word Continuous Speech Recognition," J Sign Process Syst, vol. 63 (2011), pp. 95-105.
K. You, et al., "Flexible and Expandable Speech Recognition Hardware with Weighted Finite State Transducers," J Sign Process Syst, published online May 15, 2011.
Glinski, et al., "Spoken language recognition on a DSP array processor," IEEE transactions on parallel and distributed systems, Jul. 1994, pp. 697-703.
Chatterjee, et al., "Connected speech recognition on a multiple processor pipeline," 1989 International Conference on Acoustics, Speech, and Signal Processing, May 23, 1989, pp. 774-777.
E Lin, "A High Speed Speech Recognition Hardware Engine," Ph.D. Thesis Proposal, Carnegie Mellon University, Pittsburgh, PA, Feb. 21, 2006.
E.C. Lin, et al., "A 1000-Word Vocabulary, Speaker-Independent, Continuous Live-Mode Speech Recognizer Implemented in a Single FPGA," Proc. ACM International Symposium on FPGAs, Feb. 2007.
E. Lin, "A High Performance Custom Hardware Backend Search Engine for a Speech Recognition System," Ph.D. Thesis, Carnegie Mellon University, Pittsburgh, PA, Dec. 13, 2007.
"The Talking Cure," The Economist (Technology Quarterly Issue), p. 11, Mar. 12, 2005.
E. Lin, "A First Generation Hardware Reference Model for a Speech Recognition Engine," M.S. Thesis, Carnegie Mellon University, Pittsburgh, PA, May 1, 2003.
P. Bourke, et al., "A High-Performance Hardware Speech Recognition System for Mobile Applications," Proc. Semiconductor Research Corporation TECHCON, Aug. 2005.
E.C. Lin, et al., "In Silico Vox: Toward Speech Recognition in Silicon," 2006 (Eighteenth) Hot Chips Symposium, Aug. 2006.
S. Shankland, "Chips Promise to Boost Speech Recognition," CNET News.com, Aug. 22, 2006.
L.D. Paulson, "Speech Recognition Moves from Software to Hardware," IEEE Computer, pp. 15-18, Nov. 2006.
R.A. Rutenbar, "Toward Speech Recognition in Silicon: the Carnegie Mellon in Silico Vox Project," Invited Talk, 2007 Brammer Memorial Lecture, Wayne State University, Oct. 2007.
K. Yu, et al., "Generating Small, Accurate Acoustic Models with a Modified Bayesian Information Criterion," Proc. Interspeech 2007, Aug. 2007.
P. Bourke, et al., "A Low-Power Hardware Search Architecture for Speech Recognition," Proc Interspeech '08, Sep. 2008.
Kim, CM, et al., "A digital chip for robust speech recognition in noisy environment," Proceedings (ICASSP '01) 2001 IEEE International Conference on Acoustics, Speech, and Signal Processing, May 7, 2001.
Buitrago, J., et al., "Speech Recognition System and its Automatic Synthesis in Hardware," IEEE Conf. on Electronics, Robotics and Automotive Mechanics Conference, Sep. 28, 2010, pp. 672-676.
S J Melnikoff, et al., "Implementing a Simple Continuous Speech Recognition System on an FPGA," Proceedings of the 10th Annual IEEE Symposium on Field-Programmable Custom Computing Machines (FCCM'02), 2002.
S J Melnikoff, et al., "Performing Speech Recognition on Multiple Parallel Files Using Continuous Hidden Markov Models on an FPGA," Proc. 2002 IEEE International Conference on Field-Programmable Technology, Dec. 16, 2002.
S J Melnikoff, et al., "Implementing log-add algorithm in hardware," Electronics Letters, Jun. 12, 2003.
S J Melnikoff, et al., "Speech Recognition on an FPGA Using Discrete and Continuous Hidden Markov Models," Proceedings of the 12th International Conference on Field-Programmable Logic and Applications: Reconfigurable Computing Is Going Mainstream, 2002.
S J Melnikoff, et al., "Reconfigurable Computing for Speech Recognition: Preliminary Findings," Proceedings of the 10th International Workshop on Field-Programmable Logic and Applications: The Roadmap to Reconfigurable Computing, 2000.
S J Melnikoff, et al., "Implementing a Hidden Markov Model Speech Recognition System in Programmable Logic," Proceedings of the 11th International Conference on Field-Programmable Logic and Applications, 2001.
S J Melnikoff, "Speech Recognition in Programmable Logic," Ph.D. Thesis, University of Birmingham, Nov. 2003.
F A Elmisery, et al., "A FPGA-Based HMM for a Discrete Arabic Speech Recognition System," Proceedings of the 15th International Conference on Microelectronics, Dec. 9, 2003.
G. Marcus, et al., "An FPGA-based Coprocessor for the SPHINX Speech Recognition System: Early Experiences," International Conference on Reconfigurable Computing and FPGAs, Sep. 28, 2005.
G-D Wu, et al., "Chip Design of LPC-cepstrum for Speech Recognition," 6th IEEE/ACIS International Conference on Computer and Information Science, Jul. 11, 2007.
K Miura, et al., "A Low Memory Bandwidth Gaussian Mixture Model (GMM) Processor for 20,000-Word Real-Time Speech Recognition FPGA System," International Conference on ICECE Technology, Dec. 8, 2008.
J. Chaiwongsai, et al., "An Architecture of HMM-Based Isolated-Word Speech Recognition with Tone Detection Function," 2008 International Symposium on Intelligent Signal Processing and Communication Systems, Feb. 8, 2009.
W. Han, et al., "A Speech Recognition IC Using Hidden Markov Models with Continuous Observation Densities," Journal of VLSI Signal Processing Systems, vol. 47, Issue 3, Jun. 2007.
E. Lin, "A High Speed Speech Recognition Hardware Engine," Ph.D. Thesis Proposal, Carnegie Mellon University, Pittsburgh, PA, Feb. 21, 2006.
A. Seward, "A fast HMM match algorithm for very large vocabulary speech recognition," Speech Communication 42 (2004), pp. 191-206.
O. Cheng, "Embedded Speech Recognition Systems," Ph.D. Thesis, Univ. of Auckland, Sep. 2008.
O. Cheng, et al., "Hardware-Software Codesign of Automatic Speech Recognition System for Embedded Real-Time Applications," IEEE Trans. on Industrial Electronics, Mar. 2011.

(56) References Cited

OTHER PUBLICATIONS

R. Veitch, et al., "Acceleration of HMM-based speech recognition system by parallel FPGA Gaussian calculation," VI Southern Programmable Logic Conference, Mar. 24, 2010.

J. Choi, et al., "An FPGA implementation of speech recognition with weighted finite state transducers," 2010 IEEE International Conference on Acoustics Speech and Signal Processing (ICASSP), Mar. 14, 2010.

A. Gomperts, et al., "Development and Implementation of Parameterized FPGA-Based General Purpose Neural Networks for Online Applications," IEEE Transactions on Industrial Informatics, Feb. 2011.

K. You, et al., "Flexible and Expandable Speech Recognition Hardware with Weighted Finite State Transducers," J. of Signal Processing Systems, May 15, 2011.

R. Veitch, et al., "FPGA Implementation of a Pipelined Gaussian Calculation for HMM-Based Large Vocabulary Speech Recognition," International Journal of Reconfigurable Computing, Sep. 2010.

Lin, EC, et al., "Moving Speech Recognition from Software to Silicon: the in Silico Vox Project," Interspeech 2006, Pittsburgh, PA, Sep. 17, 2006.

Jeong, H., et al., English language abstract of KR1020060108895, "Speech Recognition Apparatus Using Two-Level Dynamic Programming Technique and Hidden Markov Model," Oct. 18, 2006.

Jeong, H., et al., English language abstract of KR1020050037125, "Apparatus for Recognizing Speech Using Hidden Markov Model, Without Using Computer," Apr. 21, 2005.

Shah, S.R., et al., English language abstract of KR1020060018888, "System and Method for Distributed Speech Recognition With a Cache Feature," Mar. 2, 2006.

Och, F., et al., U.S. Appl. No. 60/775,570, filed Feb. 21, 2006.

Och, F., et al., U.S. Appl. No. 60/774,790, filed Feb. 17, 2006.

Spec sheet entitled, "Speech Recognition IC," http://www.talentedsoft.com, Aug. 9, 2010.

"Philips New Speech Recognition IC," http://www.futurlec.com/News/Philips/SpeechChip.html, 1999.

Email entitled, "Voice Recognition Processors (Database): Nov. 29, 1995 Version.".

W. Han, et al., "A Speech Recognition IC Using Hidden Markov Models with Continuous Observation Densities," Journal of VLSI Signal Processing 47, pp. 223-232, 2007.

W. Han, et al., "A Real-Time Chinese Speech Recognition IC With Double Mixtures," IEEE, 2003.

Spec sheet entitled, "NLP-5x: Natural Language Processor With Motor, Sensor and Display Control," Sensory Inc., 2010.

L. Bottou et al., "Speaker-Independent Isolated Digit Recognition: Multilayer Perceptrons vs. Dynamic Time Warping," Neural Networks, vol. 3, 1990, pp. 453-455.

S. Lee et al., "Application of Fully Recurrent Neural Networks for Speech Recognition," IEEE, 1991, pp. 77-80.

R. Lipmann, "Review of Neural Networks for Speech Recognition," Neural Computation, 1989, pp. 1-38.

A. Waibel, "Modular Construction of Time-delay Neural Networks for Speech Recognition," Neural Computation, 1989. pp. 39-46.

K. Lang et al., "A Time-Delay Neural Network Architecture for Isolated Word Recognition," Neural Networks, vol. 3, 1990, pp. 23-43.

S. Kong et al., "Differential Competitive Learning for Centroid Estimation and Phoneme Recognition," IEEE Transactions on Neural Networks, vol. 2, No. 1, Jan. 1991, pp. 118-124.

S. Escola et al., "Hidden Markov Models for the Stimulus-Response Relationships of Multistate Neural Systems," Neural Computation 23, pp. 1071-1132 (2011).

* cited by examiner

ACOUSTIC SCORING UNIT IMPLEMENTED ON A SINGLE FPGA OR ASIC

This application claims the benefit of provisional patent application Ser. No. 61/008,727, filed Dec. 24, 2007, the disclosure of which is hereby incorporated herein by reference in its entirety.

This invention was made with government support under HR0011-07-3-0002 awarded by DARPA. The Government may have certain rights in this invention.

FIELD OF THE DISCLOSURE

The present invention relates to speech recognition, and more particularly relates to a scoring unit for a speech recognition system that is implemented in hardware.

BACKGROUND

Speech recognition tools translate human speech data into searchable text. Whether running on a desktop personal computer (PC) or an enterprise server farm, today's state-of-the-art speech recognizers exist as complex software running on conventional computers. This is profoundly limiting for applications that require extreme recognition speed. Today's most sophisticated recognizers fully occupy the computational resources of a high-end server to deliver results at, or near, real-time speed where each hour of audio input requires roughly one hour of computation for recognition. Applications range from homeland security, such as searching through large streams of audio intercepts for threats to national security, to video indexing, such as automatically creating a computer-readable text transcription from an audio component or soundtrack of a recorded video.

The high level architecture of a modern, state-of-the-art speech recognition system 10 is illustrated in FIG. 1. The speech recognition system 10 includes a feature extraction stage 12, an acoustic scoring stage 14, and a backend search stage 16. FIG. 2 is a graphical illustration of the speech recognition system 10. Generally, speech is acquired, digitized by an analog-to-digital converter (ADC) 18, and segmented into a sequence of overlapping windows at roughly millisecond-level granularity. From here, the first step in recognition is to extract meaningful information from each speech segment at the feature extraction stage 12. The feature extraction stage 12 uses digital signal processing (DSP) techniques find the best parameters, or features, to uniquely discriminate different sounds. This involves a set of filtering actions, spectral analysis (via Fast Fourier Transform (FFT)), nonlinear combination of spectral components in ways consistent with the physiology of the human auditory system, and the calculation of time derivatives of these quantities over several frames of speech to track dynamics. Several common methods have evolved, most notably Mel-Frequency Cepstral Coefficients (MFCC) and Perceptual Linear Prediction (PLP). At the output of the feature extraction stage 12, the features are assembled into a feature vector 20 and passed to the acoustic scoring stage 14. The feature vector 20 is a unique "fingerprint" for speech heard in one input frame.

Next, the acoustic scoring stage 14 receives the feature vector 20 for the speech heard in one input frame, and matches the feature vector 20 against a large library of stored atomic sounds. These atomic sounds are obtained from training over a very large number of speakers, all speaking from a target vocabulary. In the earliest recognizers, these atomic units of speech were phonemes, or phones, where phones are the smallest units of sound that distinguish meaning in different words. There are approximately 50 such phones in the English language, corresponding roughly to the familiar consonant and vowel sounds. For example, "five" has three phones: /f/ /i/ /v/, and "nine" also has three phones: /n/ /i/ /n/. Modern recognizers improve on this idea by modeling phones in context, as illustrated in FIG. 3. For example, the middle vowel /i/ sound in "five" is different than the middle vowel /i/ sound in "nine" because of context. Therefore, as a first complication, for the English language, roughly 50×50×50 sounds—now called triphones—are modeled as the library of recognizable acoustic units. Note that different languages have different basic phones, but the idea works across languages. Each of these ~100,000 sounds is further decomposed into a set of frame-sized sub-acoustic units called senones. A complete model, which is referred to as an acoustic model, at this stage typically has several thousand senones.

As graphically illustrated in FIG. 4, the acoustic scoring stage 14 operates to match the feature vector 20 (a point in feature space) received from the feature extraction stage 12 against a library of atomic sounds (senones, each a complex region in feature space). The most common strategy is to model each senone as a Gaussian Mixture Model (GMM), where a GMM is a weighted sum of Gaussian density functions, each with an appropriately fit mean (center) and variance (radius). For every senone, the acoustic scoring stage 14 calculates a number—a calculated GMM probability—that the just-heard feature matches that senone. Assuming a diagonal covariance matrix, the GMM probability for each senone is calculated based on the following equation:

$$PROB_s(X) = \sum_{i=1}^{n(s)} \frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right),$$

where $n(s)$ is the number of Gaussians in the mixture, $w_{s,i}$ is a weight of the i-th Gaussian for senone s, $|\Lambda_{s,i}|$ is the determinant of covariance matrix $\Lambda_{s,i}$ for the i-th Gaussian for senone s, $\sigma_{s,i,j}^2$ is the variance for the j-th dimension of d-dimensional density for the i-th Gaussian for senone s, $x_j$ is the j-th element of d-dimensional feature vector X, and $\mu_{s,i,j}$ is the j-th element of a d-dimensional mean for the i-th Gaussian for senone s.

In conventional usage, the logarithm (log) of the GMM probability is used for subsequent computational convenience. This log(probability) is calculated for each senone and delivered to the following backend search stage 16. A complex acoustic model can easily have 10,000 senones, each modeled with 64 Gaussians, in a space dimension between 30 and 50. The output of the acoustic scoring stage 14 is a vector of scores—10,000 log(probability) numbers, in this case—one per senone. Note that a new feature vector 20 is input to the acoustic scoring stage 14 for each frame of sampled speech. In response, the acoustic scoring stage 14 outputs a vector of scores including one score per senone for each frame of sampled speech based on the corresponding feature vector 20.

Returning to FIGS. 1 and 2, the backend search stage 16 uses a layered recognition model to first assemble features into phones (each modeled as sequence of senones), then into words (stored in a dictionary, each modeled as a sequence of phones). At the lowest, acoustic level of this process, Hidden Markov Models (HMMs) are used to model each phone where senones are the states in each HMM. At the top layer of this process, a language model provides additional statistical knowledge of likely word sequences to further aid in recognition. At its most fundamental level, the backend search stage 16 constructs a network in which the entire language is represented as a huge directed graph. This graph is itself a cross-product of three separate sets of graphs: the language model, which represents words in likely context; the phonetic model of each word, i.e., a linear sequence of phones for each word; and the acoustic model, which is a linear sequence of feature-matched senones for each phone. FIG. 5 shows an example of the language, phone, and acoustic layers of the backend search process for a simple example with a two-word vocabulary. There are two components to search: the construction of the graph, and the process of finding the best path through the graph. In practical recognition systems, the graph is vastly too large to be statically constructed, and so is built dynamically, frame by frame. Pruning operations remove unlikely (low probability) nodes as needed. The best path through the graph can be found using strategies such as the Viterbi algorithm. The result of the backend search is a sequence of recognized (i.e., the most likely) words.

A complex acoustic model comprises: a high-dimensional feature vector delivered every few milliseconds; a large library of stored atomic sounds called senones; and for each senone, a numerical GMM comprising a large set of high-dimensional Gaussian densities. For each frame of sampled speech (i.e., every few milliseconds), the acoustic scoring stage 14 is required to calculate a likelihood score—a log (probability)—for each senone in the acoustic model and deliver the scores for the senones to the backend search stage 16 for subsequent recognition of word fragments (phones), words, and word sequences (from a language model). Thus, one issue with conventional implementations of the speech recognition system 10 is that the acoustic scoring stage 14 is a bottleneck for applications that require extreme speed. As such, there is a need for a high-speed acoustic scoring stage for a speech recognition system.

SUMMARY OF THE DETAILED DESCRIPTION

The present invention provides a hardware implemented acoustic scoring unit for a speech recognition system and a method of operation thereof. In general, the acoustic scoring unit includes acoustic scoring logic and high score ciphone identification logic. Rather than scoring all senones in an acoustic model used for the speech recognition system, the acoustic scoring logic first scores a set of context independent phones, or ciphones, based on acoustic features for one frame of sampled speech. The acoustic scoring logic then scores a number of senones associated with a number (N) of highest scored ciphones from the set of ciphones. In one embodiment, the number (N) is three. While the acoustic scoring logic scores the senones associated with the N highest scored ciphones, the high score ciphone identification logic operates in parallel with the acoustic scoring unit to identify one or more additional ciphones from the set of ciphones, other than the N highest scored ciphones, that have scores greater than a threshold. Once the acoustic scoring unit finishes scoring the senones for the N highest scored ciphones, the acoustic scoring unit then proceeds to score senones associated with the one or more additional ciphones identified by the high scoring ciphone identification logic.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a hardware acoustic scoring unit for a speech recognition system and a method of operation thereof. In general, the acoustic scoring unit includes acoustic scoring logic and high score ciphone identification logic. Rather than scoring all senones in an acoustic model used for the speech recognition system, the acoustic scoring logic first scores a set of context independent phones, or ciphones, based on acoustic features for one frame of sampled speech. The acoustic scoring logic then scores a number of senones, or atomic sounds, associated with a number (N) of highest scored ciphones from the set of ciphones. In one embodiment, the number (N) is three. While the acoustic scoring logic scores the senones associated with the N highest scored ciphones, the high score ciphone identification logic operates in parallel with the acoustic scoring unit to identify one or more additional ciphones from the set of ciphones, other than the N highest scored ciphones, that have scores greater than a threshold. Once the acoustic scoring unit finishes scoring the senones for the N highest scored ciphones, the acoustic scoring unit then proceeds to score senones associated with the one or more additional ciphones identified by the high scoring ciphone identification logic.

In the preferred embodiment, by operating the high score ciphone identification logic in parallel with the acoustic scoring logic, the acoustic scoring logic is generally enabled to substantially continuously score either ciphones or senones until acoustic scoring for the frame is complete. Further, by scoring only those senones associated with the N highest scored ciphones and the one or more additional ciphones having scores greater than the predetermined threshold, rather than scoring all senones, and by enabling the acoustic scoring logic to substantially continuously score either ciphones or senones, high-rate acoustic scoring is provided.

Figure 6:
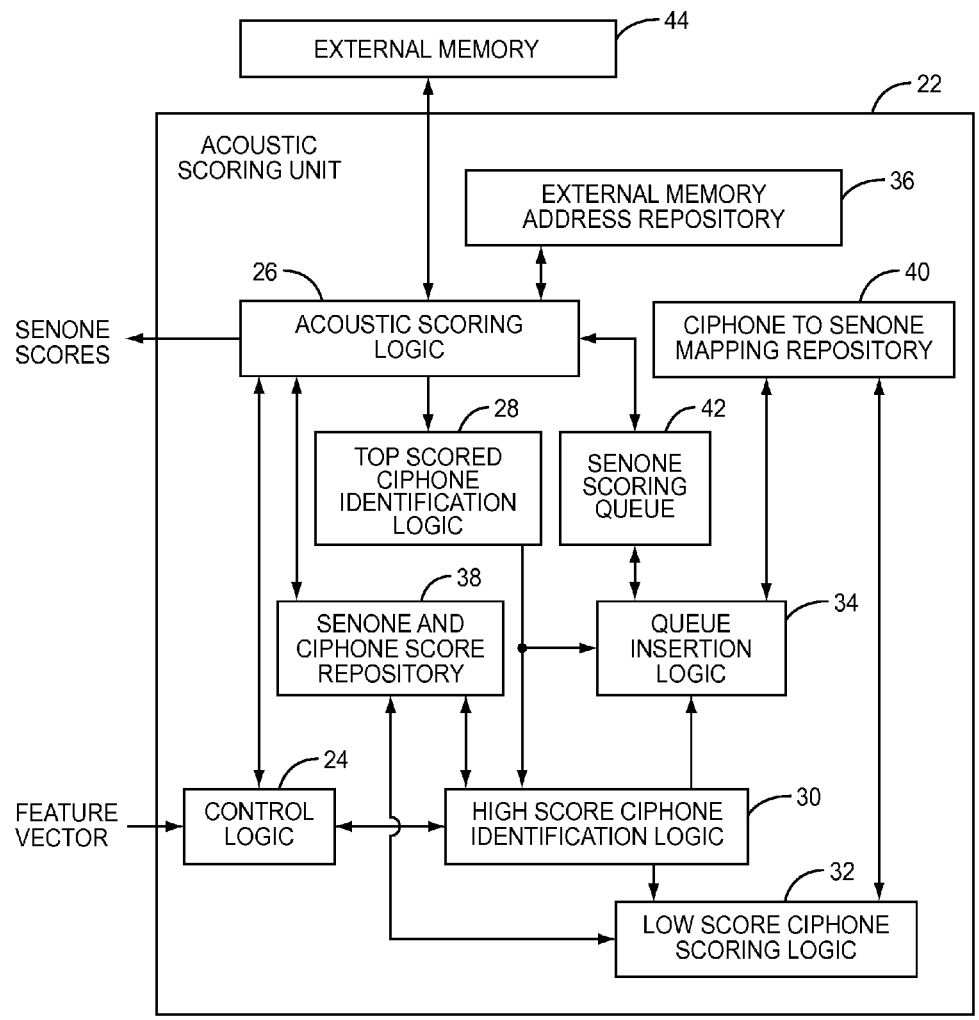
FIG. 6 illustrates a hardware acoustic scoring unit according to one embodiment of the present invention.

FIG. 6 illustrates a hardware implemented acoustic scoring unit 22 (hereinafter "acoustic scoring unit 22") for a speech recognition system according to one embodiment of the present invention. The acoustic scoring unit 22 generally includes control logic 24, acoustic scoring logic 26, top scored ciphone identification logic 28, and high score ciphone identification logic 30. In addition, in this embodiment, the acoustic scoring unit 22 includes low score ciphone scoring logic 32 and queue insertion logic 34. Note that while the control logic 24, the acoustic scoring logic 26, the top scored ciphone identification logic 28, the high score ciphone identification logic 30, the low score ciphone scoring logic 32, and the queue insertion logic 34 are illustrated separately, they may be implemented together on a single integrated circuit (IC) such as, for example, a single Application Specific Integrated Circuit (ASIC) or a single Field Programmable Gate Array (FPGA), or implemented separately on two or more ICs such as, for example, two or more ASICs each including one or more of the logics 24-34 or two or more FPGAs each including one or more of the logics 24-34.

Lastly, the acoustic scoring unit 22 also includes an external memory address repository 36, a senone and ciphone score repository 38, a ciphone to senone mapping repository 40, and a senone scoring queue 42. The repositories 36-40 and the senone scoring queue 42 may be implemented in one or more internal memory devices of the acoustic scoring unit 22. For example, in one embodiment, the acoustic scoring unit 22 is implemented on a single IC, and the repositories 36-40 and the senone scoring queue 42 are implemented in one or more internal memory units included in the IC such as one or more Static Random Access Memory (SRAM) units. For each ciphone and each senone, an external memory device 44, such as a Dynamic Random Access Memory (DRAM) device, stores constants to be used for scoring that particular ciphone or senone. In one embodiment, the constants are Gaussian Mixture Model (GMM) constants, as discussed below.

For each ciphone in an acoustic model used by the acoustic scoring unit 22, the external memory address repository 36 stores one or more addresses in the external memory device 44 in which constants to be used for scoring that ciphone are stored. Likewise, for each senone in an acoustic model used by the acoustic scoring unit 22, the external memory address repository 36 stores one or more addresses in the external memory device 44 in which constants to be used for scoring that senone are stored. The senone and ciphone score repository 38 is used to store scores for each senone and ciphone. The ciphone to senone mapping repository 40 stores, for each ciphone, information identifying a number of senones associated with that ciphone. Preferably, the senones associated with each ciphone are unique such that no senone is associated with more than one ciphone. The senone scoring queue 42 is a queue of senones to be scored by the acoustic scoring logic 26.

Figure 1:
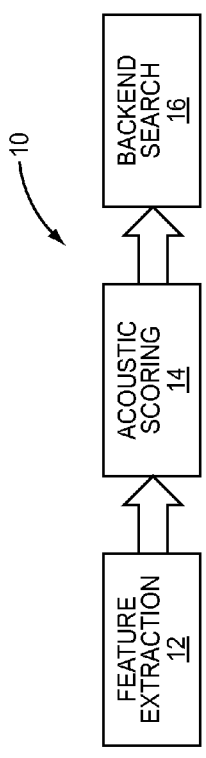
FIG. 1 illustrates decoding stages of a prior art speech recognition system.
Figure 2:
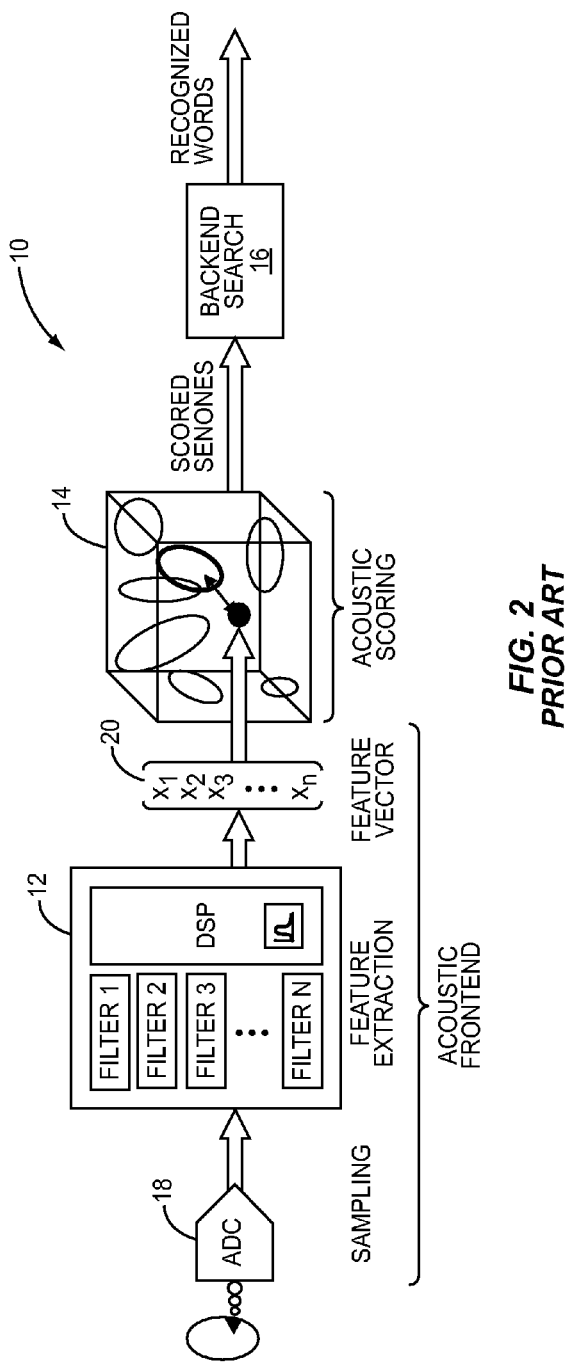
FIG. 2 graphically illustrates the operation of the feature extraction and acoustic scoring stages of the prior art speech recognition system of FIG. 1.
Figure 3:
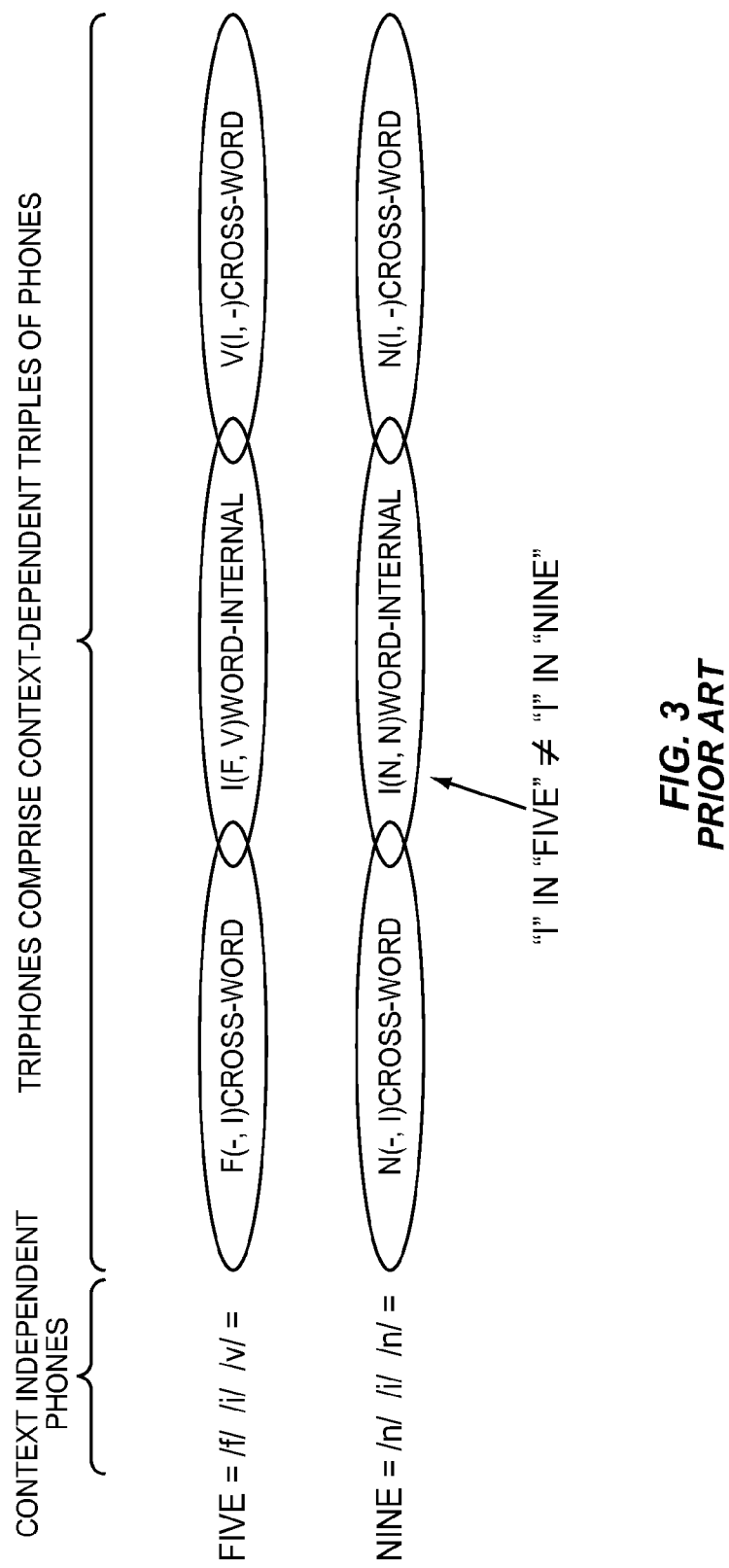
FIG. 3 illustrates context-dependent phones, or triphones, according to the prior art.
Figure 4:
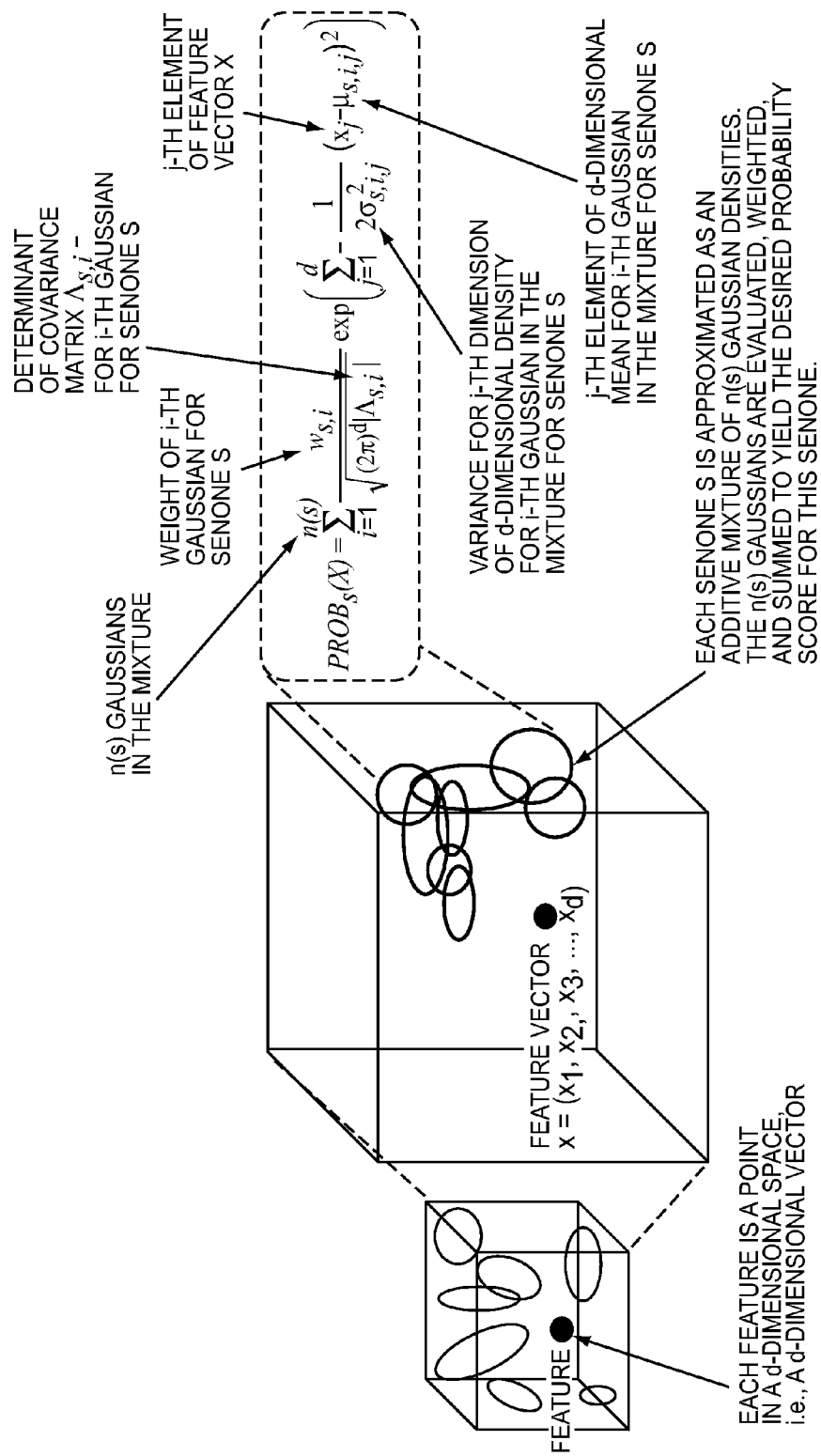
FIG. 4 graphically illustrates the operation of the acoustic scoring stage of the prior art speech recognition system of FIG. 1, wherein the acoustic scoring stage computes a matching probability for each atomic sound in a library.
Figure 7:
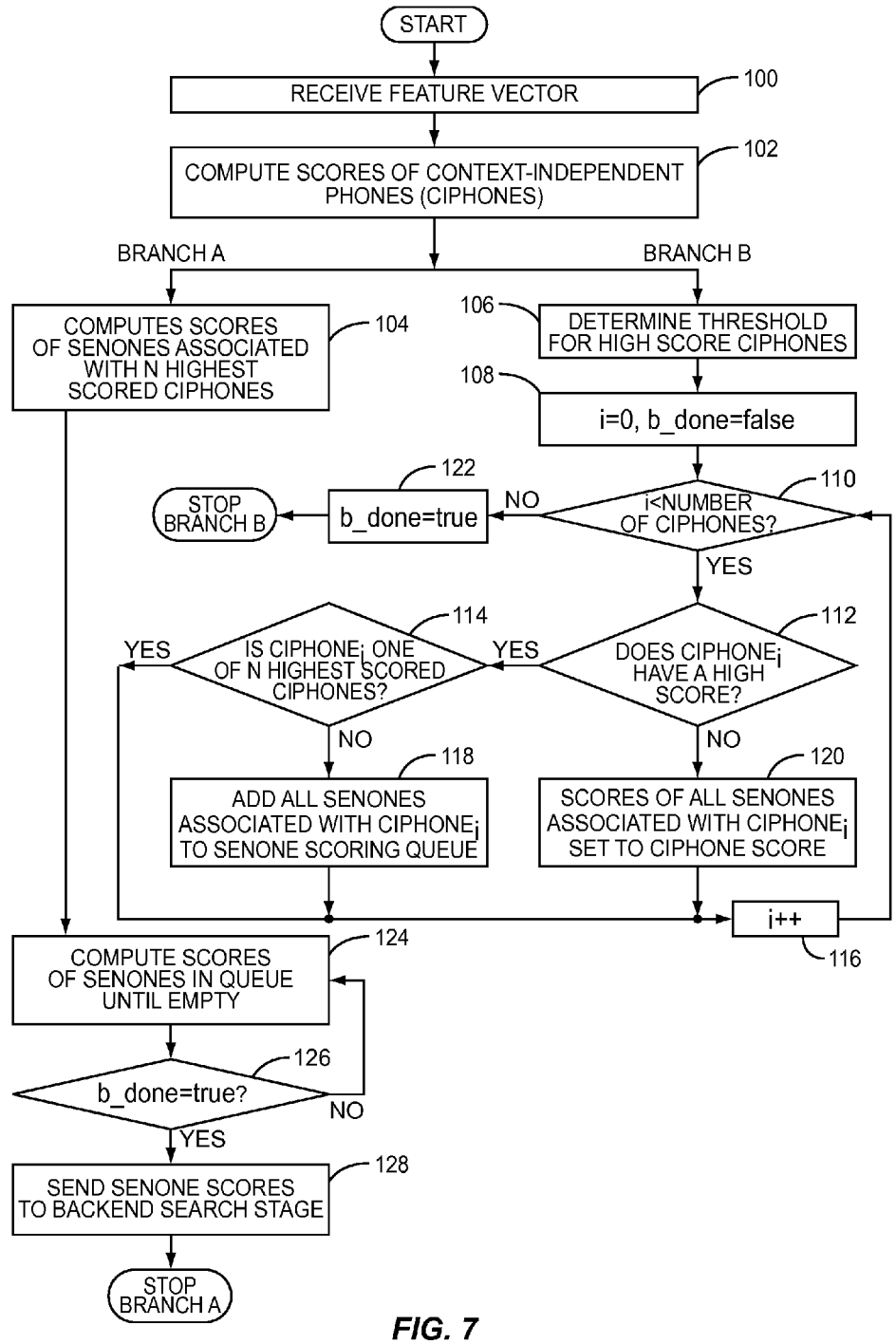
FIG. 7 is a flow chart illustrating the operation of the hardware acoustic scoring unit of FIG. 6 according to one embodiment of the present invention.

FIG. 7 is a flow chart illustrating the operation of the acoustic scoring unit 22 of FIG. 6 according to one embodiment of the present invention. First, the control logic 24 receives a feature vector, or similar data structure, providing acoustic features for one frame of sampled speech (step 100). The feature vector is received from a feature extraction stage such as, or similar to, the feature extraction stage 12 of FIG. 1. For this embodiment, the feature extraction stage is preferably implemented in hardware. However, the present invention is not limited thereto. As will be appreciated by one of ordinary skill in the art upon reading this disclosure, the feature extraction stage uses digital signal processing (DSP) techniques to find the best parameters, or features, to uniquely discriminate different sounds. In one embodiment, feature extraction involves a set of filtering actions, spectral analysis (via Fast Fourier Transform (FFT)), nonlinear combination of spectral components in ways consistent with the physiology of the human auditory system, and the calculation of time derivatives of these quantities over several frames of speech to track dynamics. Several common methods have evolved, most notably Mel Scale filtering (MFCC) and Perceptual Linear Prediction (PLP). At the output of the feature extraction stage, the features are assembled into a feature vector, which is passed to the acoustic scoring unit 22 and received by the control logic 24.

The control logic 24 then passes the feature vector to the acoustic scoring logic 26. The acoustic scoring logic 26 and the top scored ciphone identification logic 28 operate to compute a score for each ciphone in the acoustic model used by the acoustic scoring unit 22 and identify a number (N) of highest scored ciphones (hereinafter "the N highest scored ciphones"), respectively (step 102). More specifically, for each ciphone in the acoustic model, the acoustic scoring logic 26 obtains the one or more addresses in the external memory device 44 storing the GMM constants to be used for scoring the ciphone from the external memory address repository 36. Using the one or more addresses for the ciphone, the acoustic scoring logic 26 obtains the GMM constants for the ciphone from the external memory device 44. The acoustic scoring logic 26 then computes the score for the ciphone based on the obtained constants and stores the score for the ciphone in the senone and ciphone score repository 38. Note that the details of the scoring process are discussed below.

As the acoustic scoring logic 26 scores the ciphones, the acoustic scoring logic 26 provides the scores for the ciphones to the top scored ciphone identification logic 28. Based on the received scores, the top scored ciphone identification logic 28 identifies the N highest scored ciphones. In the preferred embodiment, N=3 such that the N highest scored ciphones are the three highest scored ciphones. Once all ciphones have been scored and the N highest scored ciphones have been identified, the top scored ciphone identification logic 28 notifies the high score ciphone identification logic 30 of the N highest scored ciphones and the highest ciphone score. In addition, the top scored ciphone identification logic 28 instructs the queue insertion logic 34 to insert senones associated with the N highest scored ciphones into the senone scoring queue 42. In response, the queue insertion logic 34 obtains the senones associated with the N highest scored ciphones from the ciphone to senone mapping repository 40 and inserts those senones in the senone scoring queue 42.

Once the senones associated with the N highest scored ciphones have been inserted into the senone scoring queue 42, the control logic 24 is notified. At this point, processing splits into two parallel branches: branch A and branch B, which are performed simultaneously. In branch A, the acoustic scoring logic 26 computes scores for the senones associated with the N highest scored ciphones (step 104). More specifically, as discussed above, the senones associated with the N highest scored ciphones have already been inserted into the senone scoring queue 42 by the top scored ciphone identification logic 28 and the queue insertion logic 34. As such, the acoustic scoring logic 26 obtains the senones associated with the N highest scored ciphones from the senone scoring queue 42. For each of the senones associated with the N highest scored ciphones, the acoustic scoring logic 26 obtains the senone from the senone scoring queue 42 and then obtains the one or more addresses in the external memory device 44 storing the GMM constants to be used when scoring the senone from the external memory address repository 36. Using the one or more addresses for the senone, the acoustic scoring logic 26 obtains the GMM constants for the senone from the external memory device 44. The acoustic scoring logic 26 then computes the score for the senone based on the obtained constants and stores the score for the senone in the senone and ciphone score repository 38. Note that the details of the scoring process are discussed below. The acoustic scoring logic 26 continues this process to score all of the senones associated with the N highest scored ciphones.

At the same time that the acoustic scoring logic 26 is scoring the senones associated with the N highest scored ciphones in branch A, in branch B, the high scored ciphone identification logic 30 determines a threshold for high score ciphones (step 106). The threshold may be statically or dynamically defined. For example, the threshold may be dynamically defined based on scores computed for all ciphones in the current frame of sampled speech. Next, a counter (i) is set to zero, and a b_done value is set to "false" (step 108). The high score ciphone identification logic 30 then determines whether the counter (i) is less than a total number of ciphones in the acoustic model (step 110). If so, the high score ciphone identification logic 30 determines whether the score for ciphone$_i$ is greater than the threshold (step 112). If the score for ciphone$_i$ is greater than the threshold, the high score ciphone identification logic 30 determines whether ciphone$_i$ is one of the N highest scored ciphones (i.e., whether the score for ciphone$_i$ is one of the N highest ciphone scores) (step 114). If so, the counter (i) is incremented (step 116), and the process returns to step 110. However, if ciphone$_i$ is not one of the N highest scored ciphones, then the high score ciphone identification logic 30 and the queue insertion logic 34 add all senones associated with ciphone$_i$ to the senone scoring queue 42 (step 118). More specifically, the high score ciphone identification logic 30 instructs the queue insertion logic 34 to add senones associated with ciphone$_i$ to the senone scoring queue 42. In response, the queue insertion logic 34 obtains the senones associated with ciphone$_i$ from the ciphone to senone mapping repository 40 and adds those senones to the senone scoring queue 42. At this point, the counter (i) is incremented (step 116), and the process returns to step 110.

Returning to step 112, if the score for ciphone$_i$ is not greater than the threshold, the high score ciphone identification logic 30 notifies the low score ciphone scoring logic 32. The low score ciphone scoring logic 32 then assigns the score of ciphone$_i$ as the score for all senones associated with ciphone$_i$ (step 120). More specifically, using the ciphone to senone mapping repository 40, the low score ciphone scoring logic 32 identifies the senones associated with ciphone$_i$. The low score ciphone scoring logic 32 then sets the scores for the associated senones in the senone and ciphone score repository 38 equal to the score for ciphone$_i$. At this point, the counter (i) is incremented (step 116), and the process returns to step 110. Returning to step 110, once all ciphones have been processed, the high score ciphone identification logic 30 sets the b_done value to "true" (step 122), thereby indicating that branch B has completed processing for the current frame of sampled speech. At this point, the process for branch B ends.

Returning to step 104, once the acoustic scoring logic 26 has completed the scoring of the senones associated with the N highest scored ciphones in step 104, the acoustic scoring logic 26 then proceeds to score the senones inserted in the senone scoring queue 42 by the high score ciphone identification logic 30 and the queue insertion logic 34 in branch B until the senone scoring queue 42 is empty (step 124). Again, the senones in the senone scoring queue 42 are the senones associated with ciphones, other than the N highest scored ciphones, having scores computed in step 102 that are greater than the threshold determined in step 106. If or once the senone scoring queue 42 is empty, the acoustic scoring logic 26, or alternatively the control logic 24, determines whether branch B has completed processing (step 126). If not, the process returns to step 124 and is repeated until processing of branch B has completed and all senones inserted into the senone scoring queue 42 have been scored. Once branch B has completed processing and the senone scoring queue 42 is empty, the acoustic scoring logic 26 sends the senone scores from the senone and ciphone score repository 38 to a backend search stage or similar downstream stage in the speech recognition system (step 128). At this point, the process for branch A ends.

In the preferred embodiment, branch B normally completes processing before the acoustic scoring logic 26 has completed scoring the senones associated with the N highest scored ciphones in step 104. However, in the event that branch B does not complete processing before the acoustic scoring logic 26 has completed scoring the senones associated with the N highest scored ciphones in step 104, by monitoring the b_done value, the acoustic scoring unit 22 ensures that all senones associated with high scored ciphones are scored. Note that, in the preferred embodiment, the number (N) may be selected such that branch B completes processing before completion of the scoring of the senones associated with the N highest ciphones in step 104 in most, if not all, situations.

Figure 5:
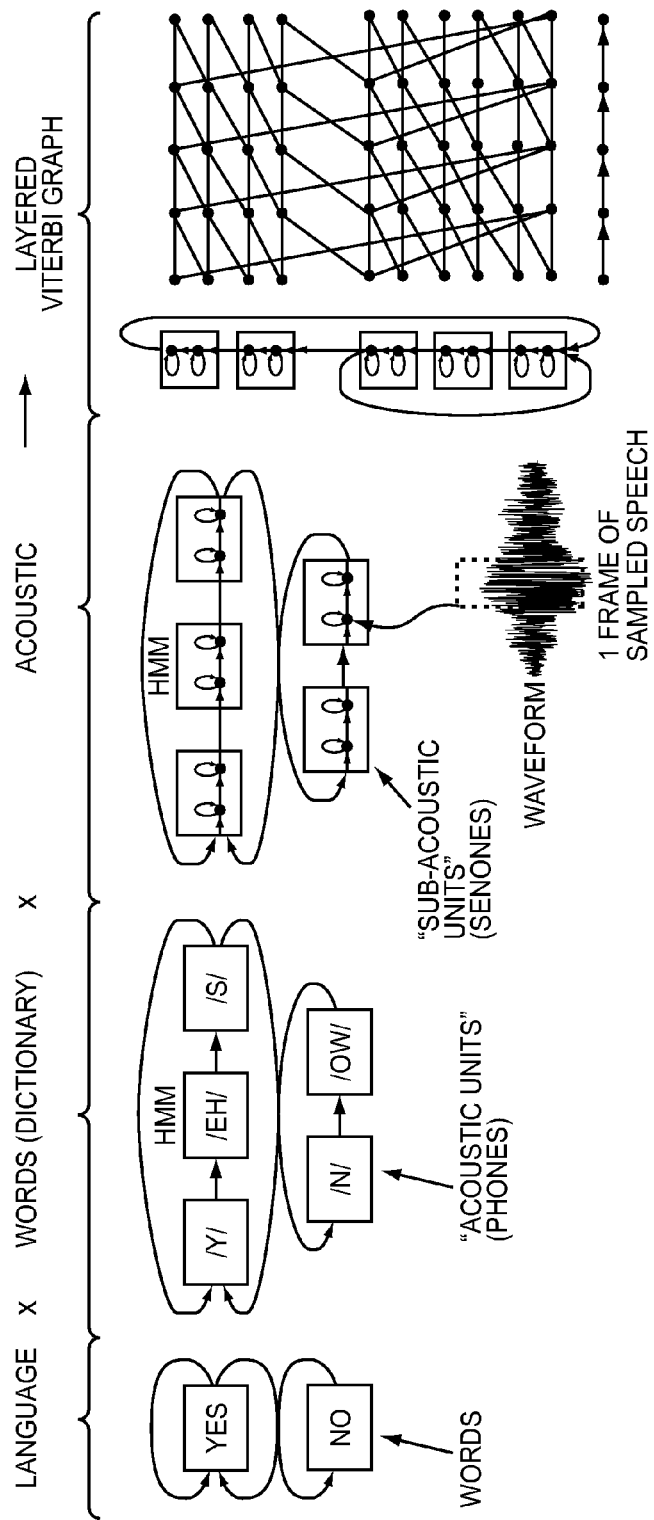
FIG. 5 graphically illustrates layers of the speech recognition process from senones to phones to words.

The acoustic scoring unit 22 of FIG. 5 and the operation thereof described in FIG. 6 include two features that substantially improve the speed of acoustic scoring as compared to conventional acoustic scoring techniques. First, rather than scoring all senones in the acoustic model, the acoustic scoring unit 22 performs GMM scoring for only those senones associated with the N highest scored ciphones and additional high scored ciphones. As a result, the number of senones scored by the acoustic scoring logic 26 is substantially less than the total number of senones in the acoustic model. Second, by scoring the senones associated with the N highest scored ciphones in parallel with identifying senones for additional high scored ciphones, the acoustic scoring unit 22 enables the acoustic scoring logic 26 to substantially continually score senones until scoring for the frame is complete in most, if not all, situations. Specifically, the high score ciphone identification logic 30 identifies ciphones, other than the N highest scored ciphones, having scores greater than the threshold and instructs the queue insertion logic 34 to add the associated senones to the senone scoring queue 42 while the acoustic scoring logic 26 scores the senones associated with the N highest scored ciphones. In the preferred embodiment, branch B completes processing before the acoustic scoring unit 26 has completed scoring the senones associated with the N highest scored ciphones in most, if not all, situations. As a result, when the acoustic scoring logic 26 completes the scoring of the senones associated with the N highest scored ciphones, the additional senones to be scored are generally already stored in the senone scoring queue 42 such that the acoustic scoring logic 26 is enabled to substantially immediately begin scoring the additional senones. In this manner, idle time for the acoustic scoring logic 26 is substantially reduced, if not essentially eliminated.

Figure 8:
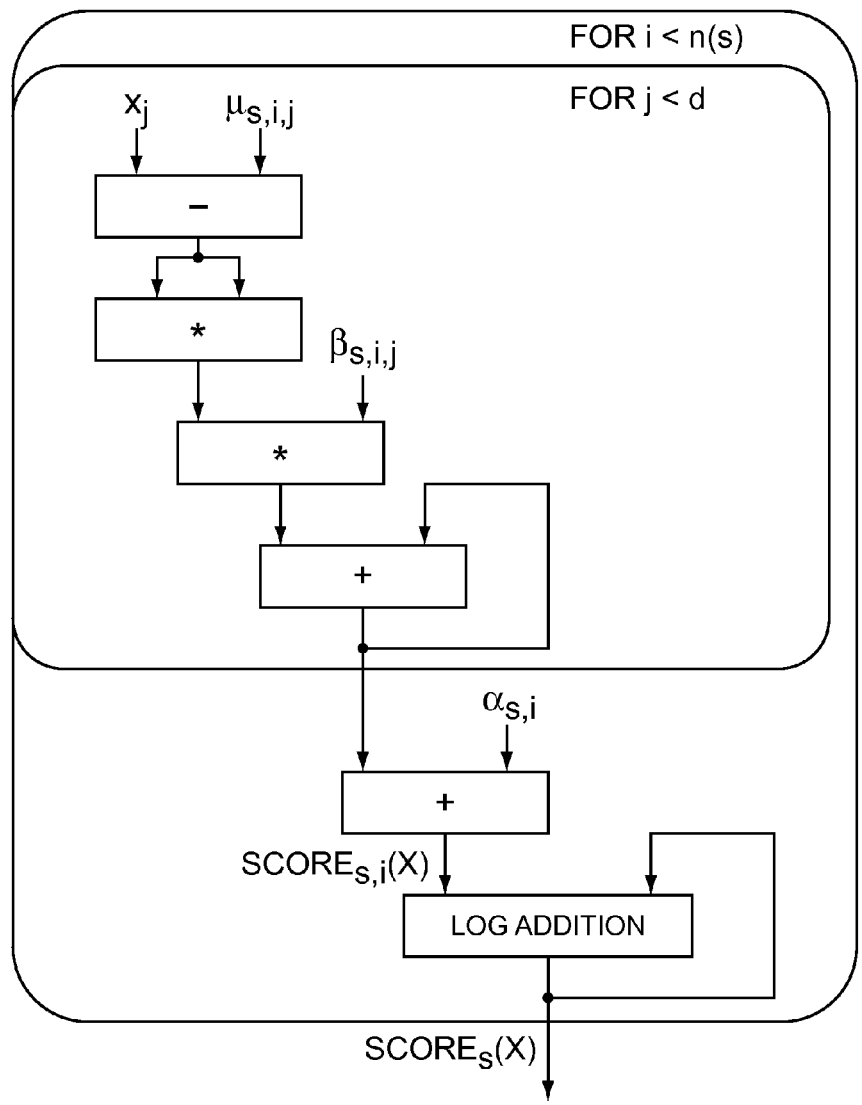
FIG. 8 graphically illustrates an exemplary process for scoring ciphones and senones according to one embodiment of the present invention.

FIG. 8 illustrates an exemplary process for performing GMM scoring for a ciphone or a senone according to one embodiment of the present invention. Generally, the probability for a senone s is defined as:

$$PROB_s(X) = \sum_{i=1}^{n(s)} \frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right), \quad (EQ\ 1)$$

where n(s) is the number of Gaussians in the mixture, $w_{s,i}$ is a weight of the i-th Gaussian for senone s, $|\Lambda_{s,i}|$ is the determinant of covariance matrix $\Lambda_{s,i}$ for the i-th Gaussian for senone s, $\sigma_{s,i,j}^2$ is the variance for the j-th dimension of d-dimensional density for the i-th Gaussian for senone s, is the j-th element of d-dimensional feature vector X, and $\mu_{s,i,j}$ is the j-th element of a d-dimensional mean for the i-th Gaussian for senone s.

During the backend search stage, the repeated multiplication of the senone probabilities causes underflow errors. To prevent this, for each senone, the acoustic scoring unit 22 computes the log of the senone probability, which is referred to as the senone score or the score of the senone. Thus, the senone score for senone s may be computed as:

$$SCORE_s(X) = \log_b\left(\sum_{i=1}^{n(s)} \frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right)\right). \quad (EQ\ 2)$$

The base of the log computation, b, is generally a number marginally larger than 1 such as, for example, 1.0003.

When computing the senone score, instead of taking the log of the sum of the mixture component probabilities, it is advantageous to compute the individual log probabilities of each mixture component because the equations can be reworked to require fewer computations. The individual log probabilities of each mixture component may be computed as:

$$SCORE_{s,i}(X) = \log_b\left(\frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right)\right). \quad (EQ\ 3)$$

A log addition may then be performed to combine individual log probabilities of each mixture component to provide the senone score for senone s. Log addition is defined in L. R. Bahl, F. Jelinek, and R. L. Mercer, *A maximum likelihood approach to continuous speech recognition*, IEEE Journal of Pattern Analysis and Machine Intelligence, pages 179-190, 1983, which is hereby incorporated by reference for its teachings related to log addition.

The equation for computing the log of individual mixture component probabilities (EQ 3) can be rewritten such that storing a modified version of the weight and variance constants further reduces computations as shown in the following equation:

$$SCORE_{s,i}(X) = \alpha_{s,i} + \sum_{j=1}^{d} \beta_{s,i,j}(x_j - \mu_{s,i,j})^2. \quad (EQ\ 4)$$

Instead of storing the weight, the log of the weight divided by the normalizing constant for the multidimensional Gaussian mixture component may be stored, which is defined as:

$$\alpha_{s,i} = \log_b\left(\frac{w_{s,i}}{\sqrt{(2\pi)^d |\Lambda_{s,i}|}}\right). \quad (EQ\ 5)$$

Also, instead of storing the variance, half of the reciprocal of the variance multiplied by the log of e may be stored as defined by:

$$\beta_{s,i,j} = -\frac{\log_b(\exp)}{2\sigma_{s,i,j}^2}. \quad (EQ\ 6)$$

Accordingly, based on Equations 4-6, the acoustic scoring logic 26 may score senones based on corresponding constants ($\alpha_{s,i}$, $\beta_{s,i,j}$, and $\mu_{s,i,j}$) stored in the external memory device 44. The same equations may also be used to score ciphones using corresponding constants for those ciphones. FIG. 8 graphically illustrates a hardware implementation of the scoring process for a senone s based on Equations 4-6.

Those skilled in the art will recognize improvements and modifications to the preferred embodiments of the present invention. All such improvements and modifications are considered within the scope of the concepts disclosed herein and the claims that follow.

What is claimed is:

1. A hardware implemented acoustic scoring unit for a speech recognition system, said acoustic scoring unit comprising a single application specific integrated circuit (ASIC) that includes:
    control logic, implemented on the single ASIC, and configured to receive feature vectors indicative of acoustic input and pass said feature vectors to acoustic scoring logic, also implemented on the single ASIC;
    senone selection logic, also implemented on the single ASIC and coupled to said control logic, said senone selection logic operating in parallel with said acoustic scoring logic to select senones for scoring by said acoustic scoring logic;
    whereby the parallel operation of said senone selection logic and said acoustic scoring logic enables said acoustic scoring logic to substantially continuously perform acoustic scoring operations until its scoring for a frame in question is complete.

2. An acoustic scoring unit as defined in claim 1, wherein said senone selection logic includes:
    a senone scoring queue, implemented as SRAM on the single ASIC, and coupled to the acoustic scoring logic.

3. An acoustic scoring unit as defined in claim 2, wherein said senone selection logic also includes:
    queue insertion logic, implemented on the single ASIC, and coupled to the senone scoring queue.

4. An acoustic scoring unit as defined in claim 1, wherein the control logic is coupled to an external memory device, and wherein the single ASIC also includes:
    an external memory address repository, implemented as SRAM on the single ASIC, and configured to store addresses used to address the external memory device, which contains constants used to score senones.

5. A hardware implemented acoustic scoring unit for a speech recognition system, said acoustic scoring unit comprising a single field programmable gate array (FPGA) that includes:
    control logic, implemented on the single FPGA, and configured to receive feature vectors indicative of acoustic input;

acoustic scoring logic, implemented on the single FPGA, and coupled to the control logic and to an external memory device;

senone selection logic, also implemented on the single FPGA and coupled to said control logic, said senone selection logic operating in parallel with said acoustic scoring logic to select senones for scoring by said acoustic scoring logic;

whereby the parallel operation of said senone selection logic and said acoustic scoring logic enables said acoustic scoring logic to substantially continuously perform acoustic scoring operations until its scoring for a frame in question is complete.

6. An acoustic scoring unit as defined in claim 5, wherein the senone selection logic includes:

a senone scoring queue, implemented as SRAM on the single FPGA, and coupled to the acoustic scoring logic.

7. An acoustic scoring unit as defined in claim 6, wherein the senone selection logic also includes:

queue insertion logic, implemented on the single FPGA, and coupled to the senone scoring queue.

8. An acoustic scoring unit as defined in claim 5, wherein the control logic is coupled to an external memory device, and wherein the single FPGA also includes:

an external memory address repository, implemented as SRAM on the single FPGA, and configured to store addresses used to address the external memory device, which contains constants used to score senones.

9. A hardware-implemented acoustic scoring stage for a speech recognition system, said acoustic scoring stage comprising:

(1) an external memory device, which stores constants used to score senones; and, (2) a single application specific integrated circuit (ASIC) that includes at least:

(a) control logic, implemented on the single ASIC, and configured to receive feature vectors indicative of acoustic input;

(b) acoustic scoring logic, implemented on the single ASIC, and coupled to the control logic and to the external memory device;

(c) senone selection logic, also implemented on the single ASIC and coupled to said control logic, said senone selection logic operating in parallel with said acoustic scoring logic to select senones for scoring by said acoustic scoring logic;

whereby the parallel operation of said senone selection logic and said acoustic scoring logic enables said acoustic scoring logic to substantially continuously perform acoustic scoring operations until its scoring for a frame in question is complete.

10. A hardware-implemented acoustic scoring stage for a speech recognition system as defined in claim 9, wherein the senone selection logic includes:

a senone scoring queue, implemented as SRAM on the single ASIC, and coupled to the acoustic scoring logic.

11. A hardware-implemented acoustic scoring stage for a speech recognition system as defined in claim 10, wherein the senone selection logic also includes:

queue insertion logic, implemented on the single ASIC, and coupled to the senone scoring queue.

12. A hardware-implemented acoustic scoring stage for a speech recognition system as defined in claim 9, wherein the single ASIC further includes:

an external memory address repository, implemented as SRAM on the single ASIC, and configured to store addresses used to address the external memory device, which contains constants used to score senones.

\* \* \* \* \*